Patented July 14, 1936

2,047,642

UNITED STATES PATENT OFFICE 2,047,642

STABILIZATION OF ANIMAL AND VEGETABLE FATS AND OILS

Carl S. Marvel, Urbana, Ill., assignor to E. I. du Pont de Nemours & Company, Wilmington, Del., a corporation of Delaware No Drawing. Application March 5, 1935, Serial No. 9,423

14 Claims. (Cl. 87—9)

This invention relates to the stabilization of animal and vegetable fats and oils against rancidity and, more particularly to the stabilization of the edible fats and oils.

It is well known that animal and vegetable fats and oils deteriorate on standing, thereby becoming rancid and acquiring objectionable taste, odor and, sometimes, color. It has been proposed to prevent or retard such deterioration by incorporating in the fats and oils various chemical compounds. Many of such chemical compounds or stabilizers are known which will effectively retard rancidity of the fats and oils. However, practically all of such compounds are unsuitable because they are toxic or otherwise objectionable in foods and therefore cannot be employed for stabilizing edible oils and fats or because they lead to objectionable discoloration, odor or taste in the oils and fats or because they are too volatile and consequently do not remain in the oil or fat during cooking or other operations.

It is an object of the present invention to stabilize animal or vegetable fats and oils or fatty glycerides against rancidity. A further object is to stabilize edible fats and oils against rancidity. A still further object is to provide suitable stabilizers for such fats and oils which stabilizers are non-toxic, odorless, tasteless, have low volatility, suitable solubility in oils and fats and which do not discolor such oils or fats. Other objects are to provide new compositions of matter and to advance the art. Still other objects will appear hereinafter.

These objects may be accomplished in accordance with my invention by incorporating in animal and vegetable fats and oils, or fatty glycerides, small amounts of tyrosine or organic esters of tyrosine. By organic esters of tyrosine, I mean the compounds resulting from the reaction of tyrosine with alcohols or phenols in accordance with the usual methods of preparing esters.

My invention is based upon the discovery that tyrosine and its organic esters, when incorporated in animal and vegetable fats and oils, inhibit or retard deterioration of such fats and oils and rancidity development therein. Of these esters, the aliphatic esters and particularly the alkyl esters derived from aliphatic alcohols are generally preferred. Furthermore, I prefer to employ, particularly for stabilizing edible fats and oils, such esters as will yield non-toxic substances, one of which will be tyrosine, when hydrolyzed by the digestive processes. Esters, such as the ethyl ester of tyrosine, which yields ethyl alcohol and tyrosine on hydrolysis, and the long chain alkyl esters of tyrosine, in which the alkyl group contains a carbon chain of at least ten carbon atoms and which yield tyrosine and the higher non-toxic alcohols, are the preferred agents.

Tyrosine or its esters may be incorporated in the oil or fat in any suitable manner. If the ester is soluble in the oil or fat in the cold, it may be simply stirred in and allowed to dissolve. The oil or fat may be heated to facilitate the solution or dispersion of the stabilizing agent therein. If desired, the stabilizers can be employed as solutions in suitable solvents, as grain alcohol. This latter method is particularly desirable where the agent is only slightly soluble in the fat or oil. Tyrosine is difficultly soluble in most oils and generally requires heat or other means to incorporate it into the oil. However, most of our compounds and the preferred compounds are readily soluble in the fats and oils.

The concentrations, in which the esters will be employed, will vary with the particular oil or fat, the degree of stabilization desired, the use to which the oil or fat is to be put and like considerations. For most purposes, the ester will be employed in the concentration of about 0.001% to 5.0% based upon the weight of the oil or fat. For stabilizing edible oils and fats, it will generally be preferred to employ from about 0.10% to 1.0% of the ester based on the oil.

By the term "animal and vegetable fats and oils", I mean those fats and oils which are of vegetable or animal origin and are glycerides of the more or less unsaturated higher fatty acids mixed with some saturated glycerides. Some of such fats and oils are linseed oil, China-wood oil, soya bean oil, castor oil, olive oil, rapeseed oil, cod liver oil and other fish oils, coconut oil, palm oil, corn oil, sesame oil, peanut oil, neat's-foot oil, butter fat, lard, beef tallow, and hydrogenated oils and fats such as are sold under the names of "Crisco" and "Snow Drift".

In order to more clearly illustrate my invention, the modes of carrying the same into effect and the advantageous results to be obtained thereby, the following examples are given:

Example 1

A portion of refined cottonseed oil was divided into two parts. One was retained as a blank or control. In the other was dissolved 1% of the ethyl ester of tyrosine. Pieces of filter paper of standard size and type were saturated with the two portions of oil, blotted to remove excess, stored in stoppered bottles at 65° C., and examined daily for rancid odor, discoloration, etc. Results were as follows:

| Stabilizer (1% Concentration) | Discoloration of Oil | Hours for Rancidity to Develop |
|---|---|---|
| None (untreated oil) | None | 176 |
| Ethyl ester of tyrosine | None | 372 |

*Example 2*

A portion of lard was melted and divided into two equal parts. In one was dissolved 1% of the ethyl ester of tyrosine. The other was retained as a blank or control. Rancidity tests were run on these two samples as in Example 1. Results were as follows:

| Stabilizer (1% Concentration) | Discoloration of Oil | Days for Rancidity to Develop |
|---|---|---|
| None (untreated lard) | None | 4 |
| Ethyl ester of tyrosine | None | 44 |

*Example 3*

Refined cottonseed oil containing 1% of the butyl ester of tyrosine was tested for rancidity development along with a portion of the same oil containing no stabilizer, as in Example 1. Results were as follows:

| Stabilizer (1% Concentration) | Discoloration of Oil | Days for Rancidity to Develop |
|---|---|---|
| None (untreated oil) | None | 7 |
| Butyl ester of tyrosine | None | Not rancid after 12 days |

*Example 4*

A portion of lard containing 1% of tyrosine was tested for rancidity as in Example 2. The tyrosine was dissolved or dispersed in the lard by heating to about 100 to 200° C. Results of the tests:

| Stabilizer (1% Concentration) | Hours for Rancidity to Develop at 65° C. |
|---|---|
| None (untreated lard heated to about 200° C.) | 44 |
| Tyrosine (in lard heated to about 200° C.) | Not rancid after 92 hours |

*Example 5*

Refined cottonseed oil containing 1% tyrosine was tested for rancidity as in Example 1. The tyrosine was dissolved or dispersed in the oil by heating to about 100 to 200° C. Results of the tests:

| Stabilizer (1% Concentration) | Hours for Rancidity to Develop at 65° C. |
|---|---|
| None (untreated oil heated to about 200° C.) | 68 |
| Tyrosine (in oil heated to about 200° C.) | Not rancid after 77 hours |

The above examples are merely illustrative of some of the compounds which may be used and the desirable results to be obtained therewith. Other esters of tyrosine which may be mentioned are: methyl ester of tyrosine, propyl ester of tyrosine, isopropyl ester of tyrosine, isobutyl ester of tyrosine, amyl ester of tyrosine, octyl ester of tyrosine, nonyl ester of tyrosine, dodecyl ester of tyrosine, palmityl ester of tyrosine, 9,10-octadecenyl ester of tyrosine, octadecyl ester of tyrosine, phenyl ester of tyrosine, phenylol ester of tyrosine, vanillyl ester of tyrosine, glyceryl ester of tyrosine.

The above and other esters may be prepared by the usual methods of esterification which are well known to those skilled in the art, employing the appropriate alcohol or phenol.

I do not wish to be limited to the use of my stabilizing agents in the raw oils and fats. My stabilizers may be employed in oils and fats which have been previously subjected to various treatments such as blowing with air at more or less elevated temperatures and to simple heat treatments. They may be employed in such raw or processed oils which are to be used as ingredients in various compositions such as textile lubricants and the like. As has been heretofore pointed out, my invention is particularly concerned with stabilization of the edible oils and fats. Such stabilized edible oils and fats may be used as ingredients in the preparation of pastries and other bakery products, potato chips, mayonnaise, salad oils and the like.

It is a characteristic of the stabilizing compounds of my invention that they impart little or no discoloration or objectionable odor or taste to the fats and oils containing them in the proportions hereinbefore indicated. This feature of these compounds is especially important for the reason that objectionable taste, odor, or color cannot be tolerated in foodstuffs. Another advantageous feature of my compounds is their low volatility in consequence of which they have little or no tendency to volatilize during heating of the oils or fats during cooking or in deep fat frying operations. However, the greatest advantage of these compounds is their non-toxicity. Heretofore, substances which have been suggested as stabilizers for edible fats and oils have been open to criticism on the ground that they may be injurious to health when eaten in foods. This objection cannot be raised against my compounds which yield tyrosine on hydrolysis since tyrosine is a break-down product of protein foods in digestive processes. In other words, tyrosine itself may be considered as a food and cannot be considered as injurious to health or even as an adulterant of foodstuffs.

While I have disclosed the preferred embodiments of my invention, it will be readily apparent to those skilled in the art that many modifications and variations may be made therein without departing from the spirit of my invention. Accordingly, the scope of my invention is to be limited solely by the appended claims construed as broadly as is permissible in view of the prior art.

I claim:

1. Animal and vegetable fats and oils having incorporated therein, in an amount sufficient to retard deterioration thereof, an organic ester of tyrosine.

2. Animal and vegetable fats and oils having incorporated therein, in an amount sufficient to retard deterioration thereof, an aliphatic ester of tyrosine.

3. Animal and vegetable fats and oils having incorporated therein, in an amount sufficient to retard deterioration thereof, an alkyl ester of tyrosine.

4. Animal and vegetable fats and oils having incorporated therein, in an amount sufficient to retard deterioration thereof, an alkyl ester of tyrosine in which the alkyl group contains a carbon chain of at least 10 carbon atoms.

5. Animal and vegetable fats and oils having incorporated therein, in an amount sufficient to retard deterioration thereof, the ethyl ester of tyrosine.

6. Edible fats and oils having incorporated therein, in an amount sufficient to retard deterioration thereof, an organic ester of tyrosine.

7. Edible fats and oils having incorporated therein, in an amount sufficient to retard deterioration thereof, an aliphatic ester of tyrosine.

8. Edible fats and oils having incorporated therein, in an amount sufficient to retard deterioration thereof, an alkyl ester of tyrosine.

9. Edible fats and oils having incorporated therein, in an amount sufficient to retard deterioration thereof, an alkyl ester of tyrosine in which the alkyl group contains a carbon chain of at least 10 carbon atoms.

10. Edible fats and oils having incorporated therein, in an amount sufficient to retard deterioration thereof, the ethyl ester of tyrosine.

11. Animal and vegetable fats and oils having incorporated therein, in an amount sufficient to retard deterioration thereof, tyrosine.

12. Animal and vegetable fats and oils having incorporated therein, in an amount sufficient to retard deterioration thereof, a deterioration retarder selected from tyrosine and organic esters of tyrosine.

13. Animal and vegetable fats and oils having incorporated therein, in an amount sufficient to retard deterioration thereof, the butyl ester of tyrosine.

14. Animal and vegetable fats and oils having incorporated therein, in an amount sufficient to retard deterioration thereof, the dodecyl ester of tyrosine.

CARL S. MARVEL.